(12) United States Patent
Paintz

(10) Patent No.: US 8,456,117 B2
(45) Date of Patent: Jun. 4, 2013

(54) DRIVING BRUSHLESS DC (BLDC) MOTORS

(75) Inventor: Christian Paintz, Erfurt (DE)

(73) Assignee: Melexis Technologies NV, Tessenderlo (BE)

( * ) Notice: Subject to any disclaimer, the term of this patent is extended or adjusted under 35 U.S.C. 154(b) by 850 days.

(21) Appl. No.: 12/065,598

(22) PCT Filed: Sep. 4, 2006

(86) PCT No.: PCT/IB2006/002430
§ 371 (c)(1),
(2), (4) Date: Dec. 11, 2008

(87) PCT Pub. No.: WO2007/026241
PCT Pub. Date: Mar. 8, 2007

(65) Prior Publication Data
US 2009/0218974 A1   Sep. 3, 2009

(30) Foreign Application Priority Data
Sep. 2, 2005 (GB) .................................... 0517907.2

(51) Int. Cl.
*H02P 6/18* (2006.01)

(52) U.S. Cl.
USPC ............ 318/400.34; 318/400.01; 318/400.32; 318/400.35

(58) Field of Classification Search
USPC ............ 318/400.34, 400.35, 400.01, 400.32, 318/400.12, 568.15, 599, 721, 400.04, 400.07, 318/400.14, 400.26; 388/828, 928.1, 909
See application file for complete search history.

(56) References Cited

U.S. PATENT DOCUMENTS

| | | |
|---|---|---|
| 4,746,844 A | 5/1988 | MacKelvie et al. |
| 4,772,839 A | 9/1988 | MacMinn et al. |
| 4,928,043 A | 5/1990 | Plunkett |
| 4,992,710 A | 2/1991 | Cassat |
| 5,001,405 A | 3/1991 | Cassat |
| 5,097,190 A | 3/1992 | Lyons et al. |
| 5,134,349 A | 7/1992 | Kruse |
| 5,144,209 A | 9/1992 | Inaji et al. |

(Continued)

FOREIGN PATENT DOCUMENTS

| | | |
|---|---|---|
| EP | 0 892 489 A1 | 1/1999 |
| EP | 0892489 A1 | 1/1999 |
| EP | 1 478 086 A | 11/2004 |

OTHER PUBLICATIONS

International Search Report issued on Feb. 23, 2007 for PCT/IB/2006/002430, with an International Filing Date of Sep. 4, 2006. (PCT Counterpart of this application).

(Continued)

*Primary Examiner* — Antony M Paul
(74) *Attorney, Agent, or Firm* — Leydig, Voit & Mayer, LLP; Gerald T. Gray

(57) ABSTRACT

A driving system for a tri-polar electric motor comprises three phase windings. Winding drivers drive each winding with a driving waveform having a non-zero driving phase and intervals wherein the input is equal to zero at the start, middle and end of each driving phase. Using a driving waveform of this type enables monitoring of the back EMF in the winding during each interval when the input is equal to zero. This enables regular monitoring of the zero crossing point of each winding and hence of the position of the rotor. This enables the motor to operate efficiently without generating a torque ripple.

18 Claims, 2 Drawing Sheets

U.S. PATENT DOCUMENTS

| | | | |
|---|---|---|---|
| 5,191,269 A | 3/1993 | Carbolante | |
| 5,191,270 A | 3/1993 | Mccormack | |
| 5,517,095 A | 5/1996 | Carobolante et al. | |
| 5,525,874 A | 6/1996 | Mallarapu et al. | |
| 5,796,235 A | 8/1998 | Schrodl et al. | |
| 5,859,512 A | 1/1999 | Burhker | |
| 5,859,520 A * | 1/1999 | Bourgeois et al. | 318/805 |
| 5,929,577 A * | 7/1999 | Neidorff et al. | 318/400.35 |
| 6,011,368 A | 1/2000 | Kalpathi et al. | |
| 6,023,141 A * | 2/2000 | Chalupa | 318/400.35 |
| 6,034,493 A * | 3/2000 | Boyd et al. | 318/400.31 |
| 6,072,289 A | 6/2000 | Li | |
| 6,107,772 A | 8/2000 | Liu et al. | |
| 6,124,689 A * | 9/2000 | Kardash | 318/400.2 |
| 6,163,120 A | 12/2000 | Menegoli | |
| 6,531,843 B2 | 3/2003 | Iwaji et al. | |
| 6,583,593 B2 | 6/2003 | Iijima et al. | |
| 6,661,192 B2 * | 12/2003 | Copeland | 318/400.35 |
| 6,795,268 B1 | 9/2004 | Ryan | |
| 6,825,646 B2 | 11/2004 | Colombo | |
| 6,885,163 B2 | 4/2005 | Heidrich | |
| 6,979,970 B2 * | 12/2005 | Iwanaga et al. | 318/400.35 |
| 6,995,530 B2 | 2/2006 | Biamonte et al. | |
| 7,138,776 B1 * | 11/2006 | Gauthier et al. | 318/400.34 |
| 7,141,949 B2 * | 11/2006 | Harwood | 318/400.35 |
| 7,166,980 B1 | 1/2007 | LeGrand | |
| 7,180,262 B2 | 2/2007 | Consoli et al. | |
| 7,202,618 B2 | 4/2007 | Ide et al. | |
| 7,245,104 B2 | 7/2007 | Tomigashi et al. | |
| 8,030,867 B1 | 10/2011 | Allison, III | |
| 2001/0048278 A1 * | 12/2001 | Young et al. | 318/254 |
| 2004/0056627 A1 | 3/2004 | Grasso et al. | |
| 2004/0075407 A1 | 4/2004 | Ohiwa et al. | |
| 2004/0263104 A1 | 12/2004 | Iwanaga et al. | |
| 2005/0146296 A1 | 7/2005 | Klemm et al. | |

OTHER PUBLICATIONS

Schmidt, et al. "Initial Rotor Angle Detection of a Non-Salient Pole Permanent Magnet Synchronous Machine," IEEE Industry Society, Annual Meeting, New Orleans, Louisiana (Oct. 5-9, 1997).

Final Office Action issued Aug. 1, 2012 corresponding to U.S. Appl. No. 12/634,991 (6 pages).

* cited by examiner

DRIVING BRUSHLESS DC (BLDC) MOTORS

The present invention relates to methods and systems used to drive multi phase brushless DC motors.

The magnetic field used to turn a permanent magnet rotor is generated using three (or more) interconnected phase windings in the stator of the motor. Each of the phase windings can be driven hi by a hi-side switch and low by a low side switch. The current flowing through such a switch is typically controlled by means of a PWM duty cycle. In a bipolar mode the current is driven through only two phase windings at a time and the third undriven phase winding is used to monitor the back EMF voltage. By monitoring the back EMF voltage, the position of the rotor can be determined. This is achieved by detecting the zero crossing point of the monitored back EMF waveform within the phase winding, the zero crossing point occurring when the rotor is in a defined position. If the position of the rotor is known, the driving of the phase windings may be synchronised with the rotor position for maximum power.

In a tri-polar (or multi-polar) mode of operation all three phase windings are driven. Typically the three phases carry currents having sinusoidal waveforms with relative phases of 120 degrees. The advantage of such an arrangement being that the torque ripple caused by driving only two coils at any one time is then minimized. However, in this mode, since the windings are each being driven all the time, the back EMF cannot be sensed in the conventional manner.

U.S. Pat. No. 5,969,491, Viti et al, teaches a method of detecting the zero crossing point using a differential amplifier and a multiplicity of externally generated timing signals. The external timing signals are used to interrupt the driving current to one of the phase windings for a particular time interval so that the phase winding can be used to monitor the back EMF. In this case, the detected back EMF is monitored for zero crossing using a comparator arrangement. The reliance on external timing signals to interrupt the driving current to a phase winding increases the complexity of the monitoring system.

U.S. Pat. No. 5,808,440, Bennett and Raffi, teaches an arrangement focussed on low ripple disc drive applications wherein there is provided a system having 2 modes and 12 phases for a complete commutation cycle, said phases including fixed times for detecting each zero crossing point. This solution thus relies upon a complex phase winding driving cycle.

It is therefore an object of the present invention to provide an alternative method of sensing the position of a rotor in an electric motor and hence an alternative method of driving an electric motor.

According to a first aspect of the present invention there is provided a method of sensing the position of a rotor of an electric motor, said rotor having a plurality of phase windings comprising the steps of: driving each phase winding with a stored waveform, said stored waveform profile being zero for a predetermined interval at the start and end of each driving phase; monitoring the back EMF in each phase winding at the start and end of each driving phase to determine the zero crossing point for each phase winding and thereby determining the position of the rotor.

In such a manner, the position of the rotor can be determined during normal multiphase operation without relying on additional external signals to interrupt the driving current.

In some embodiments, said stored waveform profile may also be zero for a predetermined interval at the middle of each driving phase and the method may include the step of monitoring the back EMF in each phase winding at the middle of each driving phase to determine the zero crossing point for each phase winding and thereby determining the position of the rotor.

The waveform profile may be stored in a storage means connected to a waveform generator. The storage means may be connected to the waveform generator via a motor control unit. Typically, for a three phase motor, the waveform generator is connected to three winding drivers, each winding driver operable to drive one of the phase windings with a high side driving waveform or a low side driving waveform with a profile substantially identical to the stored waveform profile. Each winding driver may be comprised of a pair of dedicated high and low side winding drivers.

The stored waveform profile may be a trapezoidal waveform profile. The profile may alternatively comprise a torque flattening waveform profile combined with a trapezoidal waveform.

A switching means is preferably provided for connecting the output of the particular phase winding with a zero driving input at any given time to a monitoring means. The switching means may be connected to the waveform generator or the winding drivers in order to determine which phase winding is being driven with a zero input. The switching means may be a multiplexer. The monitoring means will monitor the back EMF signal in the phase winding to determine the zero crossing point and hence the position of the rotor.

The monitoring means may comprise: an analogue to digital converter operable to obtain two samples of the back EMF; and processing means for calculating the zero crossing point by interpolation. The processing means may be a dedicated microcontroller or may be incorporated into the motor control unit. Preferably the analogue to digital converter only takes two samples for each interpolation, however if greater accuracy is required additional samples may be taken. Preferably, there is a delay between the switching means connecting a phase winding to the monitoring means and the analogue to digital converter taking a first sample. Such a delay will enable ringing in the back EMF signal to dissipate before a sample is taken. The delay can be predetermined or may be determined by monitoring either the back EMF signal directly or by monitoring the output of the analogue to digital converter to determine that any ringing has sufficiently dissipated.

According to a second aspect of the present invention there is provided a method of determining the zero crossing point of the back EMF in a phase winding of an electric motor wherein the driving signal in the phase winding is zero for a time interval during which the zero crossing occurs or is expected to occur, comprising the steps of: sampling the back EMF signal on two separate occasions during the time interval; determining the zero crossing point by interpolation from the two samples.

This method enables digital processing circuitry to be used in calculating the zero crossing point and eliminates the need to connect the back EMF signal to a comparator.

The method of the second aspect of the present invention may incorporate any features described in respect of the first aspect of the present invention as desired or as appropriate. In particular, the sampling may be carried out by an analogue to digital converter. The method may include the additional steps of connecting the analogue to digital converter to a plurality of different coils of a motor, in turn, to determine the zero crossing point for each phase winding in turn. Furthermore, the method preferably includes delaying taking the first sample to allow any ringing in the back EMF signal to dissipate. The delay can be predetermined or may be determined by monitoring either the back EMF signal directly or by monitoring the output of the analogue to digital converter to determine that any ringing has sufficiently dissipated.

The method of the second aspect of the present invention may be used in conjunction with the method of the first aspect of the invention but may also be used with methods wherein the driving signal to a phase winding is interrupted by an external signal or is set to zero by any other means.

According to a third aspect of the present invention there is provided a method of driving an electric motor incorporating the method of sensing the position of a rotor of the first aspect of the present invention and/or the method of determining the zero crossing point of the back EMF in a phase winding of the second aspect of the present invention.

According to a fourth aspect of the present invention there is provided a electric motor driven by the method of the third aspect of the present invention.

In order that the invention is more clearly understood, one embodiment will be described in greater detail below, with reference to the accompanying drawings in which.

Figure 1:
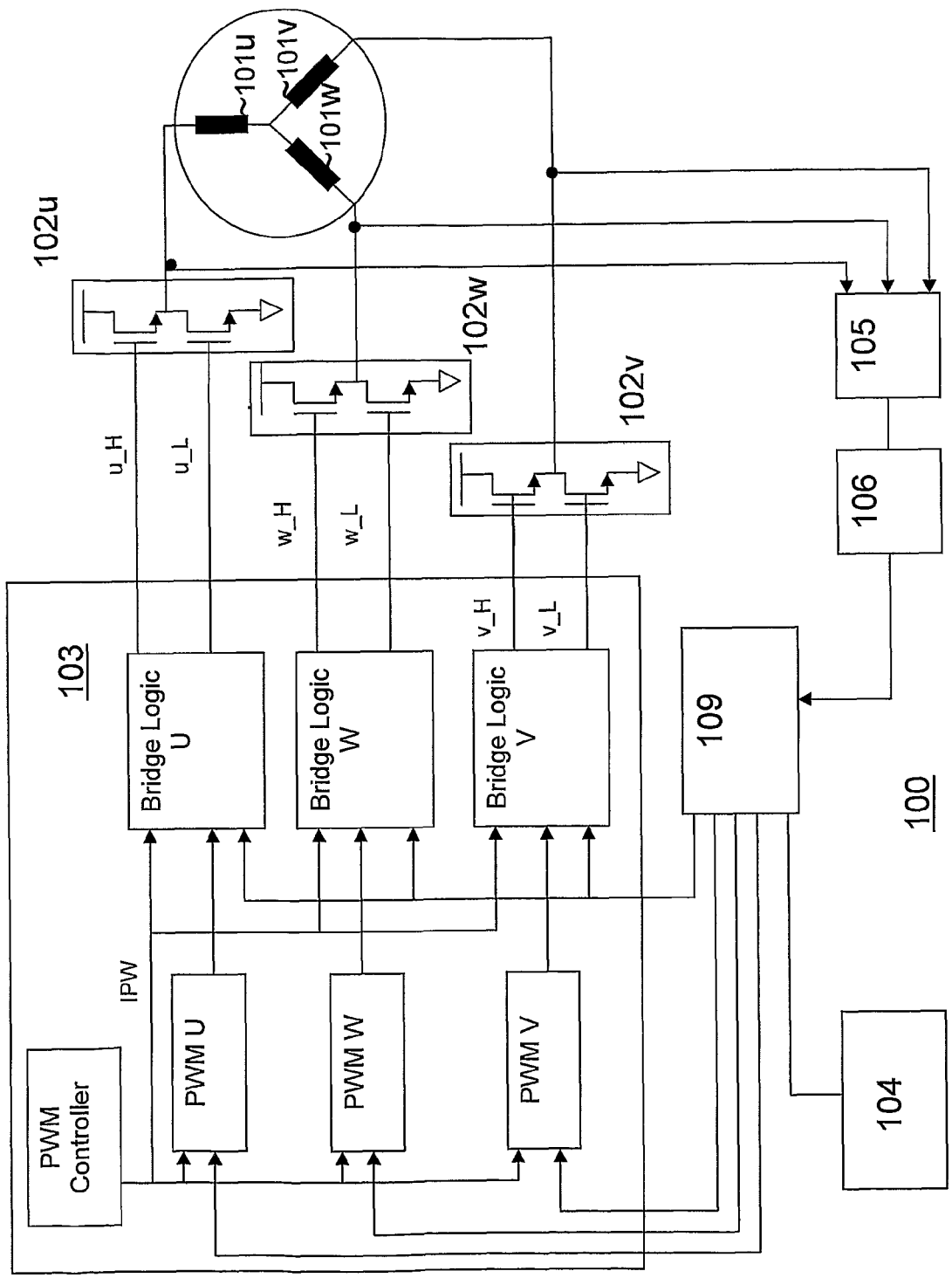
FIG. 1 is a schematic block diagram of the driving system of a tri-polar electric motor.

Referring now to FIG. 1, the driving system for a tri-polar electric motor 100 comprises three phase windings 101u-101w. Each phase winding is driven by a winding driver 102u-102w, which may comprise a pair of winding drivers one for driving the high side and the other for driving the low side. The winding drivers 102u-102w drive each winding 101u-101w with a driving waveform 200 of the type shown in FIG. 2.

The driving waveform 200 has a non-zero driving phase and intervals wherein the input is equal to zero at the start, middle and end of each driving phase. Using a driving waveform 200 of this type enables monitoring of the back EMF in the winding during each interval when the input is equal to zero. This enables regular monitoring of the zero crossing point of each winding 101u-101w and hence of the position of the rotor. This enables the motor to operate efficiently without generating a torque ripple. The waveform 200 in FIG. 2 comprises a trapezoidal waveform combined with a torque-flattening profile.

The waveform profile 200 is stored in a storage means 104, which may comprise a ROM table. The storage means is connected to a motor control unit 109. The motor control unit 109 is connected to a waveform generator 103 which generates the waveform 200 and inputs it to each winding driver 102u-102w. As is shown in FIG. 1, the waveform generator 103 comprises a main PWM (pulse wave modulation) controller and dedicated PWM units PWM U-PWM W for each output to the winding drivers 102u-102w. The PWM units, PWM U-PWM W, are each connected to the respective winding drivers 102u-102w via Bridge logics U-W. Typically the winding drivers 102u-102w would be adapted to insert an appropriate phase difference into the generated waveforms 200 used to drive each respective winding 101u-101w.

Figure 3:
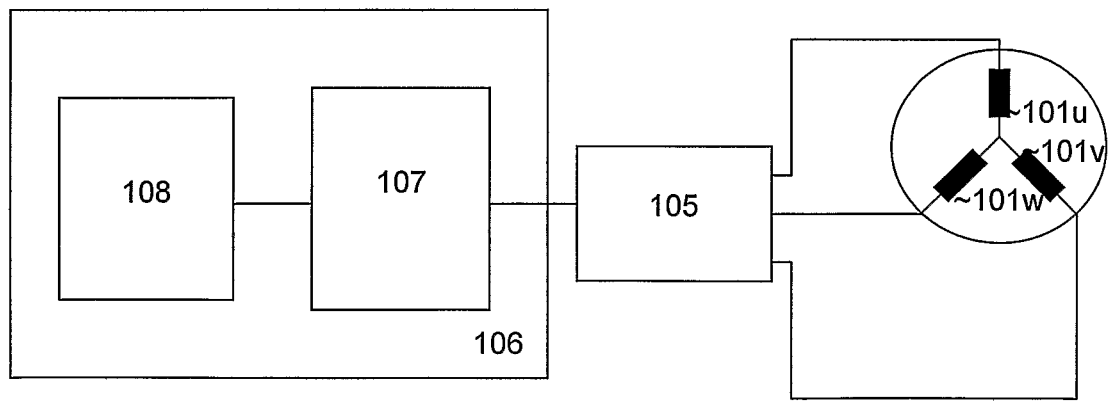
FIG. 3 is a schematic block diagram of the monitoring system of the tri-polar electric motor of FIG. 1.

In order to monitor the position of the rotor, a monitoring system of the type shown in FIG. 3 is used. The monitoring system comprises a switching means 105, typically a multiplexer, and a monitoring means 106. The switching means is connected to each winding 101u-101w and is operable to connect the each winding 101u-101w to the monitoring means 106 in turn. The windings 101u-101w are connected to the monitoring means when the input driving waveform 200 for the particular winding 101u-101w is equal to zero. This allows the monitoring means 106 to monitor the back EMF in each winding 101u-101w in turn.

Figure 2:
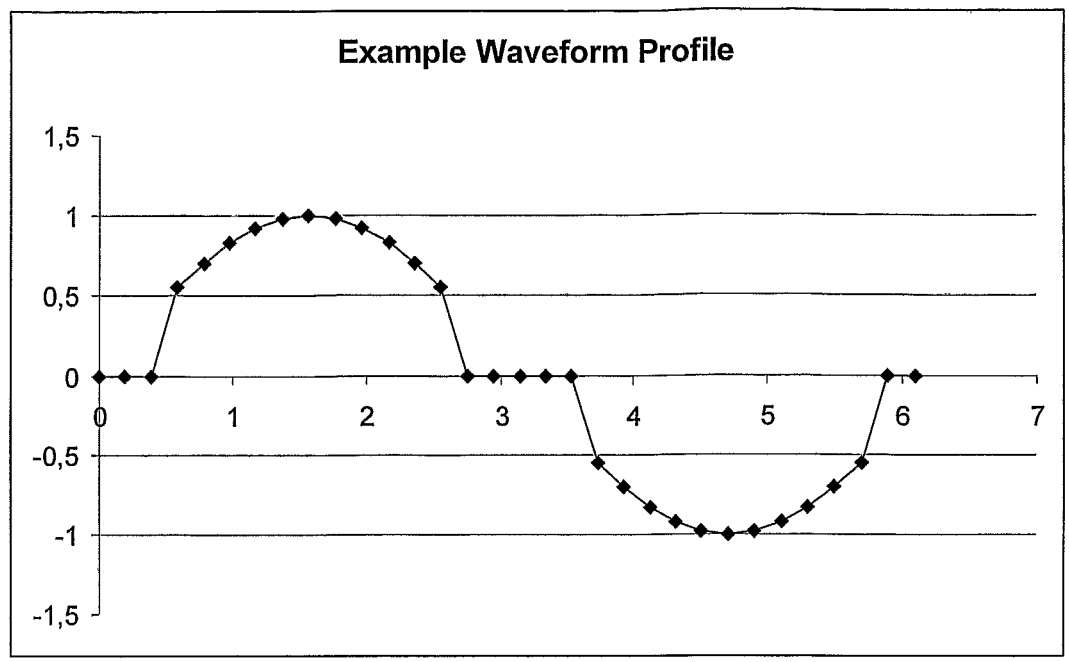
FIG. 2 shows a profile of a waveform for driving each phase winding in the tri-polar motor of FIG. 1.

The monitoring means 106 comprises an analogue to digital converter 107 and a processor 108. The analogue to digital converter 107 converts the back EMF signal into a digital signal and feds it to the processor 108. The processor 108 monitors the analogue to digital converter 107 output to determine when any ringing associated with the driving waveform 200 dropping to zero has sufficiently dissipated. The processor 108 then takes two samples of the analogue to digital converter 107 output. The processor 108 then interpolates from the two samples the position of the zero crossing for the particular winding 101u-101w. The processor 108 may then further calculate the position of the rotor. As shown in FIG. 2, the processor 108 is a dedicated unit for calculating the zero crossing and outputting that information to the motor control unit 109, however, in alternative embodiments, this functionality could be incorporated directly into the motor control unit 109.

The processor 108 may take samples on both sides of or one side of the expected zero crossing. In other embodiments the processor 108 may take more than two samples for interpolation. Where possible, a minimum of samples is however preferred to reduce calculation time. In some embodiments rather than monitoring the output of the analogue to digital converter 107 to determine when to take samples, the processor 108 may instead delay for a predetermined time period. In some embodiments, rather than monitoring the output of the analogue to digital converter or delaying for a predetermined time period, a comparator is used to determine when to take samples.

The use of a digital processing as above enables quick and accurate calculation of the zero crossing to be made and furthermore provides this data in a convenient form for input into other systems connected with the motor 100.

It is of course to be understood that the invention is not to be restricted to the details of the above embodiment which is described by way of example only.

The invention claimed is:

1. A method of sensing the position of a rotor of an electric motor, said motor having a plurality of phase windings, the method comprising the steps of:
    driving each phase winding with a stored waveform, said stored waveform profile being set to zero for a predetermined interval at the start and at the end of each driving phase, said stored waveform profile further comprising a torque flattening waveform profile combined with a trapezoidal driving waveform; and
    monitoring the back EMF in each phase winding during a time period when the stored waveform profile is zero over the predetermined interval at the start and end of each driving phase to determine the zero crossing point of the back EMF for each phase winding by:
    using a monitoring means having an analogue to digital converter to obtain two samples of the back EMF during the time period when the stored waveform profile is zero over the predetermined interval;
    using a switching means for connecting the output of the particular phase winding with a zero driving input at any given time to the monitoring means; and
    using processing means to calculate the zero crossing point by interpolation and thereby determining the position of the rotor.

2. A method as claimed in claim 1 wherein said stored waveform profile is also zero for a predetermined interval at the middle of each driving phase and the method includes the step of monitoring the back EMF in each phase winding at the middle of each driving phase to determine the zero crossing point of the back EMF for each phase winding and thereby determining the position of the rotor.

3. A method as claimed in claim 1 wherein the waveform profile is stored in a storage means connected to a waveform generator.

4. A method as claimed in claim 3 wherein the storage means is connected to the waveform generator via a motor control unit.

5. A method as claimed in claim 3 wherein for a three phase motor, the waveform generator is connected to three winding drivers, each winding driver operable to drive one of the phase windings with a high side driving waveform or a low side driving waveform with a profile substantially identical to the stored waveform profile.

6. A method as claimed in claim 5 wherein each winding driver is comprised of a pair of dedicated high and low side winding drivers.

7. A method as claimed in claim 1, wherein the switching means is connected to the waveform generator or winding drivers in order to determine which phase winding is being driven with a zero input.

8. A method as claimed in claim 7 wherein the switching means is a multiplexer.

9. A method as claimed in claim 1 wherein the monitoring means monitors the back EMF signal in the phase winding to determine the zero crossing point and hence the position of the rotor.

10. A method as claimed in claim 1 wherein the processing means is a dedicated microcontroller.

11. A method as claimed in claim 1 wherein the processing means is incorporated into the motor control unit.

12. A method as claimed in claim 1 wherein the analogue to digital converter only takes two samples for each interpolation.

13. A method as claimed in claim 1 wherein there is a delay between the switching means connecting a phase winding to the monitoring means and an analogue to digital converter taking a first sample.

14. A method as claimed in claim 13 wherein the delay is predetermined.

15. A method as claimed in claim 13 wherein the delay is determined by monitoring the back EMF signal directly.

16. A method as claimed in claim 13 wherein the delay is determined by monitoring the output of the analogue to digital converter to determine that any ringing has sufficiently dissipated.

17. A method of sensing the position of a rotor of an electric motor, said motor having a plurality of phase windings, the method comprising the steps of driving each phase winding with a stored waveform, said stored waveform profile being set to zero for a predetermined interval at the start and at the end of each driving phase;

monitoring the back EMF in each phase winding during a time period when the stored waveform profile is zero over the predetermined interval at the start and end of each driving phase to determine the zero crossing point of the back EMF for each phase winding by:

using a monitoring means having an analogue to digital converter to obtain two samples of the back EMF during the time period when the stored waveform profile is zero over the predetermined interval;

using a switching means for connecting the output of the particular phase winding with a zero driving input at any given time to the monitoring means; and using processing means to calculate the zero crossing point by interpolation and thereby determining the position of the rotor.

18. The method of claim 17, wherein said stored waveform profile has a shape comprising a torque flattening waveform profile in combination with a trapezoidal waveform profile.

\* \* \* \* \*